US008255254B2

(12) United States Patent
Kumar et al.

(10) Patent No.: US 8,255,254 B2
(45) Date of Patent: Aug. 28, 2012

(54) PROGRAM MANAGEMENT SYSTEMS AND METHOD THEREOF

(75) Inventors: Satyendra Kumar, Bangalore (IN); Aman Kumar Singhal, Bangalore (IN); Vasudevan Sankaran, Bangalore (IN); Akhila Ramachandran Jha, Bangalore (IN); Hareshkumar Mahadevrao Amre, Vadodara (IN); Sunil Talloo, Pune (IN); Anand J. Raghavan, Bangalore (IN); Harish Venkatesh Kulkarni, Mysore (IN); George Ittyerah, Kottayam (IN); Aruna C. Newton, Bangalore (IN)

(73) Assignee: Infosys Limited, Bangalore (IN)

( * ) Notice: Subject to any disclaimer, the term of this patent is extended or adjusted under 35 U.S.C. 154(b) by 927 days.

(21) Appl. No.: 11/944,219

(22) Filed: Nov. 21, 2007

(65) Prior Publication Data

US 2008/0270205 A1    Oct. 30, 2008

(30) Foreign Application Priority Data

Nov. 21, 2006    (IN) .......................... 2157/CHE/2006

(51) Int. Cl.
*G06Q 10/00*    (2012.01)
(52) U.S. Cl. ..................... 705/7.13; 705/7.12; 705/7.11; 705/7.17; 705/7.23; 705/28; 709/223; 709/224; 709/226
(58) Field of Classification Search ................... 705/7.13
See application file for complete search history.

(56) References Cited

U.S. PATENT DOCUMENTS

2002/0198926 A1 * 12/2002 Panter et al. .................. 709/106
2006/0122873 A1 * 6/2006 Minotto ........................... 705/7

OTHER PUBLICATIONS

United States Department of Health & Human Services Enterprise Performance Life Cycle Framework—Overview Document (Oct. 1, 2008) 79ppg.*

* cited by examiner

*Primary Examiner* — James A Reagan
(74) *Attorney, Agent, or Firm* — Klarquist Sparkman, LLP (57) ABSTRACT

A framework for managing a lifecycle of a program in an organization is provided. The framework includes a process module, a guiding module, a program lifecycle mapping module, and a matrix module. The process module provides a plurality of process guidelines for the one or more stages of the project management lifecycle. Further, the process module includes a strategic planning module, a financial management module, a risk management module, an organization change management module, a stake holder management module, a knowledge management module, a contractual compliance module, a governance module and a program setup module. The guiding module integrates a plurality of organizational attributes with the process guidelines of the process module. The program lifecycle mapping module maps the plurality of process guidelines with the one or more stages of the life cycle. The matrix module provides assignment of program management roles to one or more participants.

18 Claims, 5 Drawing Sheets

| Matrix for role mapping (R – Responsible, A – Accountable, S – Supportive role for execution, C – Consulted, I- Informed) | RASCI Mapping |
|---|---|
| Customer | |
| Program Sponsor | A |
| Program champion | S |
| Steering committee members | S |
| Business process representatives (includes IT, Legal, Finance, HR, Infrastructure etc.) | C |
| Business users | |
| Organization | |
| Program Manager | R |
| Steering committee members (includes alliance partners) | C |
| Subject Matter Experts (Domain, Technology, Legal, Finance etc.) | S |
| Track/Tower Leads | C |
| Track team | |
| 3rd Party Vendors | |
| Vendor manager | C |
| Vendor team | |
| Other Program stakeholders (both external and internal) (eg. Government agencies, statutory bodies etc.) | I |

PROGRAM MANAGEMENT SYSTEMS AND METHOD THEREOF

BACKGROUND

The invention is related generally to lifecycle of a program in an organization. More specifically, the invention relates to a framework and method for managing large business transformation programs in the organization.

A program refers to a group of related projects, work streams and tracks being executed in an organization to achieve a common business objective. Program management refers to management of the group of related projects in a synergistic manner to achieve a common business objective. In today's business scenario, large scale organizations need service providers such as Information Technology (IT) services provider, who can provide end-to-end business transformation solutions and effective management of the business programs. The programs involve a large scale organization change management, managing multiple stakeholders and integrating various services and solutions across geographies. Accordingly, the programs include multiple projects which need to be continuously optimized and prioritized. These projects typically span several years and are multi disciplinary.

However, conventional project management techniques use time-bound approaches that have pre-defined objectives. These approaches do not scale up and cater to the complexities of a program.

In light of the foregoing, there is a need for a comprehensive program management framework that specifically relates to managing large business transformation programs.

SUMMARY

An object of the invention is to provide a framework for managing a lifecycle of a program in an organization.

Another object of the invention is to enhance efficiency in a plurality of related projects being executed in the organization.

Yet another object of the invention is to provide a comprehensive management technique for the program for management of large business transformations.

To achieve the above mentioned objectives, the invention provides a framework for managing a lifecycle of a program in an organization. The lifecycle of the program may include one or more stages. The framework includes a process module, a guiding module, a program mapping module, and a matrix module. The process module provides a plurality of process guidelines for the one or more stages of the lifecycle of the program. Further, the process module includes a strategic planning module, a financial management module, a risk management module, an organization change management module, a stake holder management module, a knowledge management module, a contractual compliance module, a governance module and a program setup module. The strategic planning module generates a strategy plan for achieving a plurality of strategic objectives associated with the program. The financial management module defines procedures for monitoring financial information of the program. The risk management module analyzes risks associated with operational level plan to achieve the strategic objectives. The organization change management module creates a mechanism for managing change in the structure of the organization in accordance with the operational level plan. The stake holder management module identifies interests of one or more stake holders in the organization. The knowledge management module defines procedures and guidelines for utilization of knowledge obtained during the lifecycle. The contractual compliance module provides a regulatory framework which identifies and monitors compliance with applicable law and a plurality of contractual obligations in the program. The governance module provides a plurality of directions for decision making during the lifecycle of the program. The governance module ensures alignment of the strategic objectives with business strategy and direction. The program setup module converts the plurality of strategic objectives of the program into an operational level plan. It defines overall plan for executing and managing the program.

The guiding module integrates a plurality of organizational attributes with the process guidelines of the process module. It helps in streamlining the function of the process module by taking into account organization policies, rules and standards. The program mapping module maps the plurality of process guidelines with the one or more stages of the life cycle. The matrix module provides assignment of program management roles to one or more participants.

The framework provides efficient management of related projects being executed across an organization. The framework facilitates a synergy between the related projects achieve the strategic objectives of the organization. Further, the framework specifically helps in managing large business transformation programs. Furthermore, the individual modules of the framework can be used independently in specific scenarios. For example, Organization Change Management process can be applied to any initiative that needs formal organization change management.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION OF DRAWINGS

The invention provides a framework for managing lifecycle of a program in an organization. The lifecycle of a program includes one or more stages. The program is implemented at the organization level to manage large business transformations. The program includes a plurality of related projects. The program further includes one or more participants such as an organization, a customer and a third party vendor.

Figure 1:
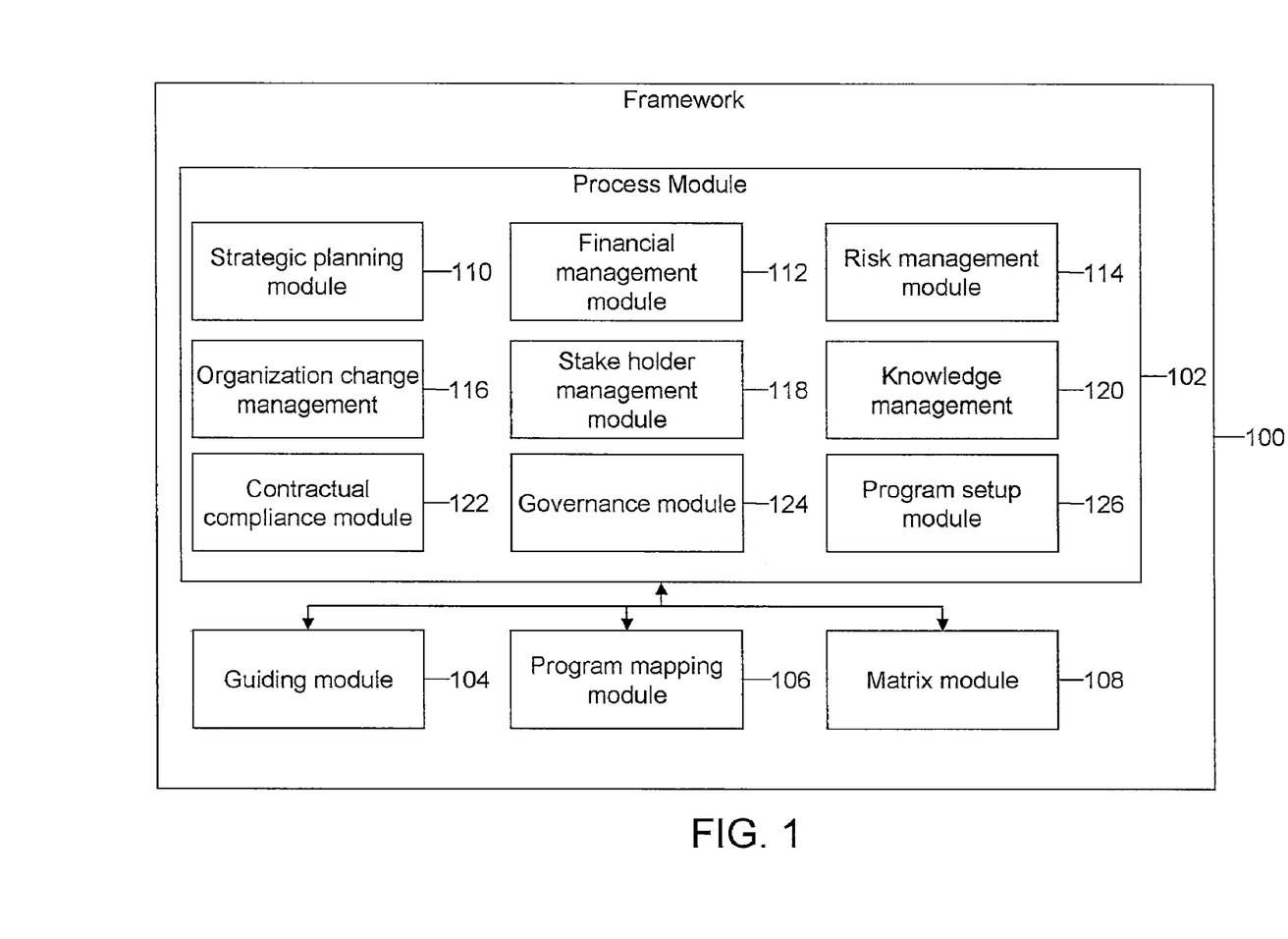
FIG. 1 is a block diagram of a framework for managing lifecycle of a program in an organization, in accordance with an embodiment of the invention.

FIG. 1 is a block diagram of a framework 100 for managing a lifecycle of a program in an organization, in accordance with an embodiment of the invention. The framework includes a Process module 102, a Guiding module 104, a Program module 106, and a Matrix module 108. Process module 102 includes a Strategic planning module 110, a Financial management module 112, a Risk management module 114, a Organization change management module 116, a Stake holder management module 118, a Knowledge management module 120, a Contractual compliance module 122, a Governance module 124 and a Program setup module 126.

Process module 102 provides a plurality of process guidelines for the one or more stages of the lifecycle of the program in the organization. Each process guideline helps in streamlining the program for management of large business transformation. The plurality of the process guidelines aligns activities in the program across the one or more stages of the lifecycle to the process guidelines. One or more process aids are used to assist in implementation of the process guidelines. Examples of process aids include, but are not limited to, templates, guideline documents, trackers and questionnaires.

Strategic planning module 110 identifies scope of the program and accordingly generates a plan for achieving a plurality of strategic objectives associated with the program. Financial management module 112 defines procedures for monitoring financial information of the program. Financial management module 112 also provides a framework for program budgeting, financial control, and reporting. Risk management module 114 analyzes risks associated with the program. This includes providing a structured process using which the risks are systematically identified, analyzed and monitored. Organization change management module 116 creates a mechanism for managing change in the structure of the organization in accordance with the plurality of strategic objectives. Stake holder management module 118 identifies one or more stakeholders for the program, and interests/expectations of the one or more stake holders in the organization. Knowledge management module 120 defines guidelines and procedures to manage, gather and use the knowledge obtained during the lifecycle of the program effectively. Contractual compliance module 122 identifies and monitors compliance with applicable law and contractual obligations in relation to the program. Governance module 124 provides a plurality of directions for decision making during the lifecycle. Program setup module 126 converts the plurality of strategic objectives of the program into an operational level plan. The functionalities of the above mentioned modules are explained in detail in conjunction with FIG. 2 and FIG. 3.

Figure 2:
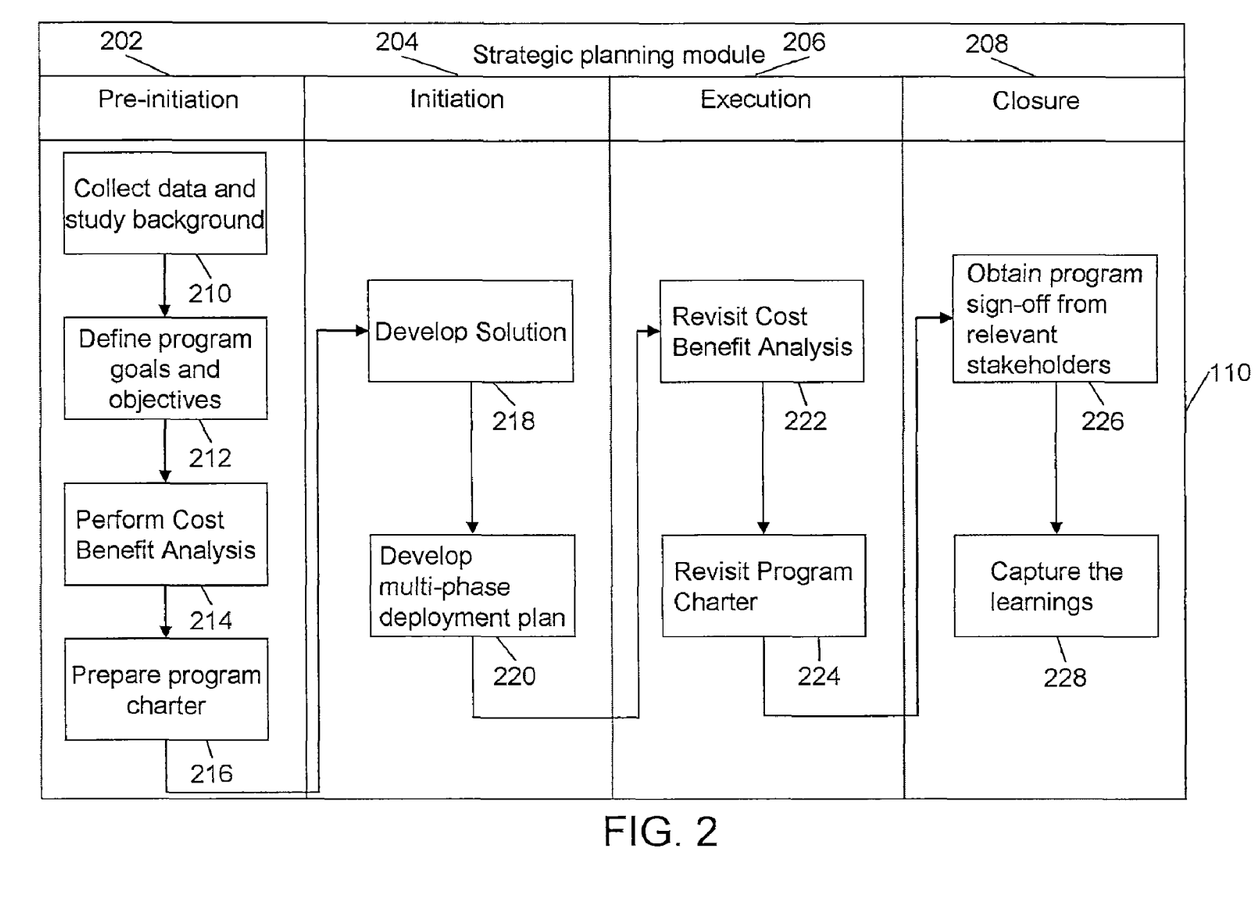
FIG. 2 is a block diagram of a Strategic planning module, in accordance with an embodiment of the invention.

Guiding module 104, integrates a plurality of organizational attributes with the process guidelines in Process module 102. Program mapping module 106 maps the plurality of process guidelines with the one or more stages of the life cycle. Matrix module 108 includes a matrix for assignment of program management roles to the one or more participants FIG. 2 is a block diagram of Strategic planning module 102 illustrating the mapping of a plurality of process guidelines with the one or more stages of the life cycle, in accordance with an embodiment of the invention. Strategic module 102 establishes a scope bound execution framework to achieve the strategic objectives of the program. Further, it also ensures that actions for execution of the program are aligned with the strategic objectives. Inputs for Strategic module 102 include a proposal, an IT strategy and a technological stack.

In accordance with various embodiments, the one or more stages include a pre-initiation stage 202, an initiation stage 204, an execution stage 206 and a closure stage 208. During pre-initiation stage 202, at 210 background study related to the program is performed. The background study includes understanding a high level strategy theme identified by a customer and identifying the vision of the customer that is to be achieved. At 210 data related to technology and market trends, technology road map, IT strategy of the customer, IT budget is collected. At 212, one or more strategic goals and objectives of the program are defined. This includes analyzing the strategic themes and identifying the business processes impacted by the strategic themes. Further, the data collected at 210 is analyzed. A problem statement is defined based on the analysis of strategic themes and business impacts. Further, the business processes related to the problem in the problem statement is assessed in terms of its monetary value. Based on the above analysis, one or more goals and objectives of the program are established. The one or more strategic goals and objectives may also be validated from the customer. At 214, Cost benefit analysis related to the one or more strategic goals and objectives is performed. In this analysis, one or more benefits based on target improvements identified in the one or more goals and objectives are calculated. Similar calculations are also performed for alternative scenarios. Further, the cost for investments based on the one or more goals and objectives is assessed. Based on the above calculations, cost benefit analysis is conducted for one or more scenarios. Accordingly, a suitable scenario for planning purpose may be selected as per the organization standards.

Thereafter, at 216, a program charter is prepared based on the scope of business process impacted. A business case is documented based on the cost benefit analysis. Further, high level mile-stones are determined based on the cost benefit scenario. Moreover, one or more stakeholders are identified based on the strategy theme. The list of the stakeholders may be validated from the customer. Based on the above, roles and responsibilities of the customer and the organization are defined in the program charter.

During initiation stage 204, at 218 a solution is developed to attain the one or more goals and objectives. One or more factors related to business processes are identified. Each of the one or more factors is classified as a facilitating factor or a hindering factor. For each of one or more hindering factors, a plurality of Information Technology (IT) solutions is identified. Further, standard mathematical techniques are used to select an efficient alternative solution. Examples of the standard mathematical techniques include, but are not limited to, Decision Analysis tools and Resolution Analysis tools. The solution thus developed is validated through the stakeholders and the customer. Thereafter, at 220, a deployment plan for execution of the solution across one or more phases is developed. A high-level phase wise execution plan is designed to align with the mile-stone mentioned in the program charter. Further, for each of the phases, deliverables, responsibilities, timelines and budget are defined. Furthermore, the one or more goals and objectives are classified according to each phase of the execution plan and a score-card is designed based on the one or more goals and objectives.

During execution stage 206, at 222, the Cost Benefit analysis performed during pre-initiation stage 202 is re-visited. The cost benefit analysis is modified based on the selected solution and the selected execution methodology. At 224, the program charter developed during pre-initiation stage is implemented. During closure stage 208, at 226, program approval is obtained from the identified stakeholders after receiving feedback. In an embodiment of the invention, knowledge points at each stage are captured by knowledge management module.

Figure 5:
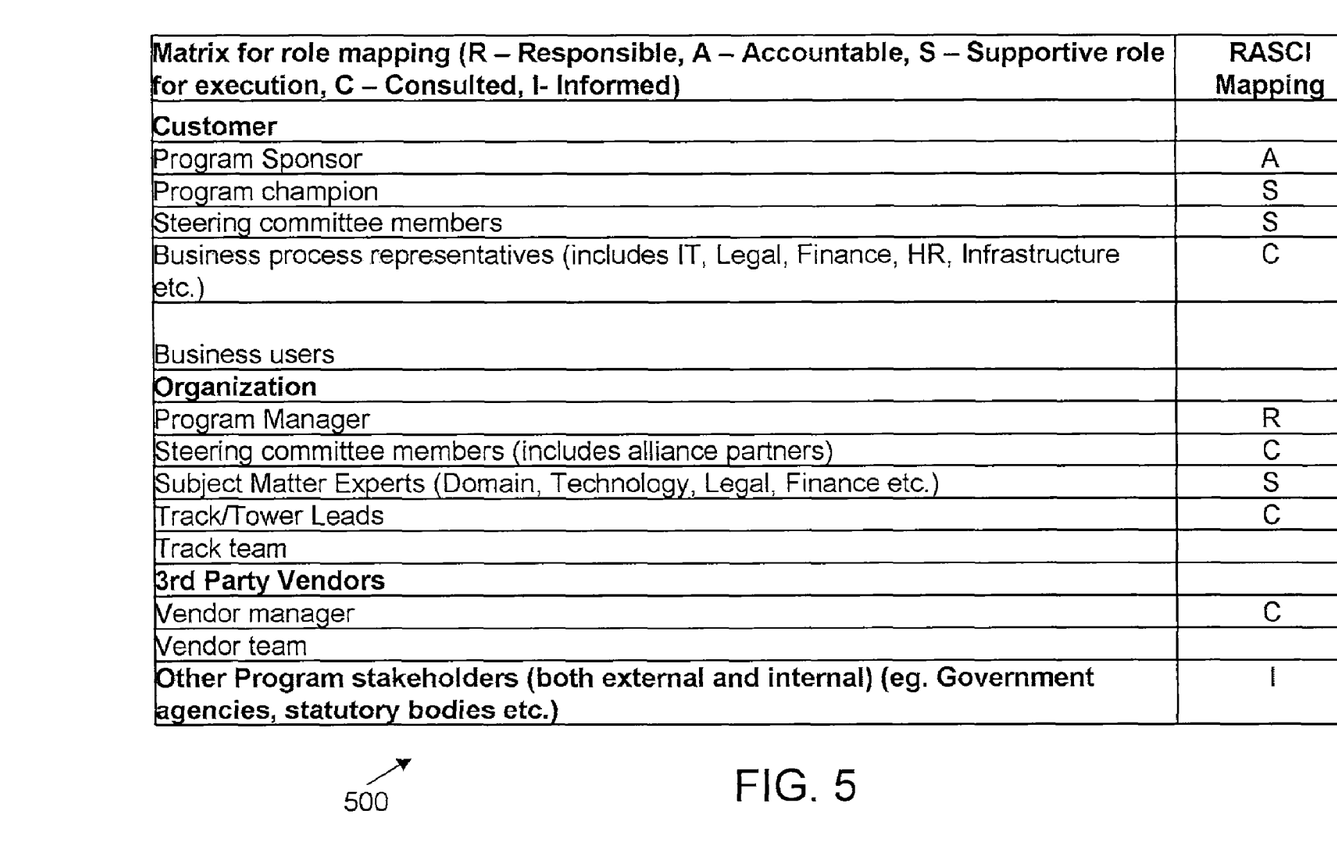
FIG. 5 is an exemplary matrix for role mapping, in accordance with an embodiment of the invention.

The one or more process aids used in Strategic planning module 110 include a cost-benefit analysis template, a program charter template, and a scorecard template. Further, a matrix is used to map one or more responsibilities of each of the one or more participants. An exemplary template of the matrix has been explained in conjunction with FIG. 5. The output of Strategic planning module 110 includes a program charter, deployment plan, a program charter and a cost-benefit analysis document. Further, the output of Strategic planning module 110 is used by the plurality of process guidelines in a Financial management module 112.

Figure 3:
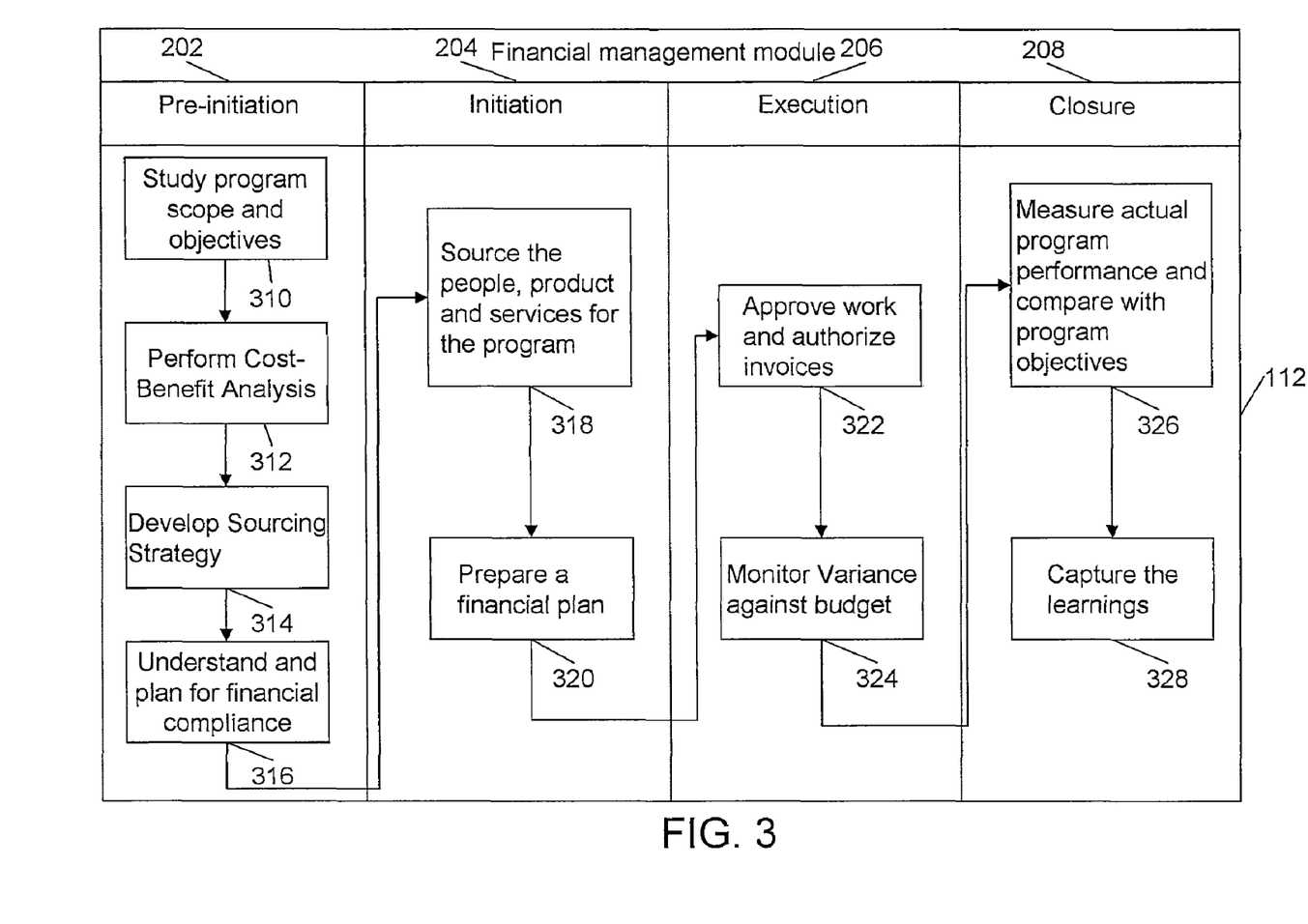
FIG. 3 is a block diagram of a Financial management module, in accordance with an embodiment of the invention.

FIG. 3 is a block diagram of Financial management module 112 illustrating the mapping of a plurality of process guidelines with the one or more stages of the life cycle, in accordance with an embodiment of the invention. Financial management module 112 defines process guidelines for financial monitoring of the program at each stage of the program. The financial monitoring enables financial control and compliance with external requirements. Examples of external requirements include, but are not limited to, corporate reporting, statutory and audit. Financial management module 112 also provides a framework which can be easily integrated with the customer's financial management system. This in turn helps in establishing a robust mechanism for program budgeting, financial control and reporting. Inputs for Financial module 112 include the proposal, one or more cost drivers, a stakeholder matrix, approved sources of funds, approved services providers and a program scorecard.

During pre-initiation stage 202, at 310, program scope, key drivers and the strategic objectives are studied and analyzed. Further, the financial and non-financial aspects of the one or more goals and objectives are studied. At 312, a cost benefit analysis related to the financial aspects is performed. This involves estimation of resources to determine the investments requirements and the expenses for the program. Examples of investment requirements include, but are not limited to, cost of hardware, software, networking equipment, and human resources. Cost benefit analysis such as above, is performed for alternative scenarios. Further, non-financial benefits are also evaluated. Examples of non-financial benefits include, but are not limited to, customer satisfaction, satisfaction of the employees of the organization, and statutory compliance. In various embodiments of the invention, the cost benefit analysis is performed as per the accounting standards and policies followed by the customer.

At 312, a sourcing strategy for products and services is formulated. In this, the requirements for various products and services required for the program are collated. Thereafter, process for selecting and approving the third party vendors is studied. Further, one or more standard sourcing terms of the customer are studied. The one or more standard sourcing terms include payment terms credit periods, and the like. Based on the above analysis, sourcing methods are selected. Examples of the sourcing methods include, but are not limited to, in-house sourcing, outsourcing, in-country sourcing and global sourcing. For outsourcing, appropriate transaction procedure is identified. Further, based on the sourcing methods, one or more third party vendors are selected for the program.

At 314, a plan for financial compliance requirements is defined. One or more compliance requirements with the laws and regulations of customer's industry and countries of operations are identified. Further, a mechanism is defined to ensure that each of the one or more compliance requirements is followed.

During initiation stage, at 318, the products and services are sourced from the selected one or more third party vendors. A Vendor management office is setup for the purpose of sourcing. The Vendor management office includes a group of people responsible for sourcing of the products and services. The group oversees bidding process and works with the legal counsel on each of the contracts with the one or more third party vendors. Thereafter, a resource baseline and a financial base line are established to segregate the total scope of the program into one or more logical units/tracks. The segregation is based on nature and type of work. For each of the one or more logical units/tracks, total scope of the work is defined. Based on this, financial investments and resourcing requirements are identified. Further, bids are invited from the one or more third party vendors. The bids are analyzed based on a plurality of bid parameters. The plurality of bid parameters include financial capability, due diligence and client reference of the one or more third party vendors. Based on the above analysis, the products and services are sourced from the selected one or more third party vendors.

At 320, a detailed financial plan for the program is prepared. Data capturing mechanisms with respect to operations and services are defined for one or more parameters. The one or more parameters include milestones, key deliverables, operational level agreements, service level agreements, and track level fund requirements. Based on the above, the detailed financial plan is prepared. The detailed financial plan may be shared with the customer.

During execution stage 206, at 322, work based on the detailed financial plan is approved and invoices for the completed work are authorized. Completion of work in accordance with the contracts is verified. Further, compliance of the one or more third party vendors is verified in accordance with the contracts. Furthermore, based on the above, full or partial payments of the invoices are authorized. At 324, variance against the detailed financial plan is monitored.

During closure stage 208, at 326, performance of the program is measured and compared with the one or more goals and objectives. At 328, key learnings from the processes in Financial management module 112 are captured.

The one or more process aids used in Financial management module 112 include a cost benefit analysis document and a program management plan template. The output of Financial management module 112 include cost-benefit analysis document, sourcing strategy, the detailed financial plan and a budget variance report Similarly, Risk management module 114, Organization change management module 116, Stake holder management module 118, Knowledge management module 120, Contractual compliance module 122, Governance module 124 and Program setup module 126 are mapped to the one or more stages of the lifecycle of the program. These modules provide steps and guidelines that need to be performed or checked by a program manager during each stage of the lifecycle of the program. The process guidelines of these modules have been described in the subsequent paragraphs.

Risk management module 114 includes the process guidelines for systematically identifying, analyzing, handling, and monitoring risks associated with the program. Inputs for Risk management module 114 include a proposal, the program charter, the stakeholder matrix and other historical information on risks associated with the organization. During pre-initiation stage 202 one or more risks are identified. Inputs are obtained from the one or more identified stakeholders on the one or more risks. Further, past engagements are referred for identifying the one or more risks. The one or more risks are then included into contract negotiation processes. During initiation stage 204, a plurality of risks strategies are defined. Each of the plurality of risks strategies includes a response in the event of occurrence of each of the one or more risks. The defining of the plurality of risks include identification of nature of risk, risk owner, cost impact, probability of occurrence, likely date of risk management, mitigation steps and extent of impact on the stakeholders. During execution 206, the one or more risks are regularly reviewed to modify the one or more risks. The modification includes addition of newly identified risks and revision of the one or more risks. Moreover, the responses for each of the one or more risks are also modified accordingly. Risk triggers are identified to enable proactive action. During closure stage 208, details of the one or more risks are recorded as learnings from the program. The one or more process aids used in Risk management module 114 include a program risk template, a risk assessment questionnaire and risk management guidelines. The output of Risk management module 114 includes the plurality of risks strategies, a list of the one or more risks and a risk status for the identified stakeholders.

Organization change management module 116 creates a mechanism for managing change in the structure of the organization in accordance with the plurality of strategic objectives. Organization Change Management mechanism is a people-centric process that is deployed during the planning and execution of complex initiatives/programs. It recognizes the uncertainties of transition and the emotions experienced by various stakeholders. Inputs for Organization change management module 116 include the proposal, a vision of the customer, the program charter, and the stakeholder matrix. During pre-initiation stage 202, one or more organizational needs for the program are defined. For identification of the one or more organizational needs, a plurality of reality judgment factors is identified. The plurality of reality judgment factors include related history of the organization, problem identification and description, and needs of the identified stakeholders. Further, level of readiness to change is identified. During initiation stage 204, impact of the change is assessed. Further, a structure is created for managing the change. The creation of the structure includes building a team of change agents, orienting the team on the need of the change and aligning the team with the vision of the identified stakeholders. Furthermore, a plurality of organizational change strategies is defined. The plurality of organizational change strategies are identified based on the one or more risks and one or more critical success factors. During execution stage 206, the plurality of organizational change strategies are executed. Further, effectiveness of the plurality of organizational change strategies is monitored regularly. Based on the monitoring, the plurality of organizational change strategies is modified accordingly. During closure stage 208, a sustenance plan for the plurality of organizational change strategies is defined. Further, details of the change initiatives are recorded as the learnings from the program. Furthermore, feedback on the plurality of organizational change strategies is obtained from the identified stakeholders. The one or more process aids used in Organization change management module 114 include Organization change management guidelines. The output of the Organization change management module 114 includes an organization change management assessment repot, the plurality of organizational change strategies and the sustenance plan.

Stake holder management module 118 identifies interests of the identified stake holders in the organization based on the strategic theme. Inputs for Stake holder management module 118 include the proposal and a role mapping matrix. During pre-initiation 202, one or more stakeholders are identified based on the impact on the program. Thereafter, background data on the identified stakeholders is obtained. During initiation stage 204, impact of the identified stakeholders is assessed. The impact is assessed by mapping the power and scale of impact across the identified stakeholders. Further, one or more conflicts between the identified stakeholders are determined. Thereafter, risks associated with each of the one or more conflicts are identified. Furthermore, a plurality of strategies for managing each of the identified stakeholders is defined. The strategies are defined based on the risks associated with the impact of each of the identified stakeholders. During execution stage 206, the strategies are implemented for each of the identified stakeholders. The plurality of strategies is implemented such that the risks associated with each of the identified stakeholders are addressed. Further, the plurality of strategies is reviewed regularly for monitoring the effectiveness based on feedback from the customer. The plurality of strategies is modified in accordance with the feedback. During closure stage 208, feedback is obtained from the identified stakeholders. Further, a stakeholder matrix is defined and shared with the customer for reference in future. The stakeholder matrix includes influence, attitude, political ramifications and expectations for each stakeholder and a strategy to manage each of the stakeholders. The learnings from the program are recorded. The process aids used in Stakeholder management module 118 include a stake holder matrix template. The output of Stake holder management module 118 includes the stakeholder matrix.

Knowledge management module 120 defines the utilization of the knowledge obtained during the one or more stages of the lifecycle of the program. Inputs for Knowledge management module 120 include the proposal, the program charter, and the stakeholder matrix. During pre-initiation stage 202, the knowledge management framework existing in the organization is studied. Further, the knowledge management framework of the customer is studied. Furthermore, one or more critical success factors are identified for the customer. Based on the critical success factors, a detailed knowledge management plan is defined. During initiation stage 204, existing systems, tools and processes are defined for knowledge management. Further, a plurality of knowledge management strategies is defined for the program. The plurality of knowledge management strategies are communicated to the identified stakeholders. During execution stage 206, the plurality of knowledge management strategies are executed. Further, the plurality of knowledge management strategies is tracked regularly for updating periodically. Furthermore, the effectiveness of the plurality of knowledge management strategies is monitored periodically. The monitoring is performed by comparing the established goals of the plurality of knowledge management strategies with the actuals goals realized by the execution. During closure stage 208, feedback is obtained from the identified stakeholders. The one or more process aids used in Knowledge management module 120 include a program case study template and a knowledge map template. The output of Knowledge management module includes the plurality of knowledge management strategies, a knowledge map and a set of knowledge assets.

Contractual compliance module 122 provides a regulatory mechanism for compliance with a plurality of contractual obligations in the program. The contractual obligations include statutory obligation and legal best practices. The process guidelines in Contractual compliance module 122 facilitates in identification and monitoring of the plurality of contractual obligations. Inputs for Contractual compliance module 122 include a master service agreement, the proposal, the program charter and a document related to the third party. During pre-initiation stage 202, the contracts are structured to endure adequate allocation of commercial risk associated with the program. Commercial risks associated with the contractual terms between the customer and the organization are assessed. During initiation stage 204, a plan for the plurality of contractual obligations is defined. The terms to be agreed by the organization and the customer are analyzed. The one or more process aids used in Contractual compliance module 122 are generated. The one or more process aids include a contracting standard positions document, a guide to contracting standard positions Document, a contract management procedure, and a legal compliance checklist. Further, a plan for legal risk management practices is defined. Furthermore, training requirements are identified for compliance with the plurality of contractual obligations. Thereafter, the requisite training is provided to one or more members of the organization executing the program. During execution stage 206, the contract management procedures and legal risk management strategies are implemented. A contract management checklist is provided to the one or more members. The one or more members are allocated responsibility for maintaining the contract management checklist. Further, compliance reviews are conducted periodically. Based on the review and the feedback received from the identified stakeholder, the contract management procedure is revised. Furthermore, compliance audits are conducted for the one or more members of the organization. The deviations from the contract management procedure are identified and remedied. During closure stage 208, the contracts are reviewed to ensure that the plurality of contractual obligations is met. The output of Contractual compliance module 122 includes the contract management procedure and the contract management checklist.

Governance module 124 provides a plurality of directions for decision making during the lifecycle of the program. Governance module 124 defines process for establishing and managing the program and the communication during the lifecycle. The plurality of directions defines and implements a structure within which the program is executed. Inputs for Governance module 124 include the proposal, the program charter, the stakeholder matrix and one or more program building blocks. In accordance with this embodiment, Governance module 124 also includes a communication module to regulate exchange of information during the life cycle of the program. The regulation includes the plurality of process guidelines for generation, collection, dissemination, storage, and final disposition of the information related to the program. During pre-initiation stage 202, a governance plan is defined. One or more criteria are defined for establishment of a plurality of governance bodies. Examples of the plurality of governance bodies include, but are not limited to, steering bodies and Program Management Office (PMO). Further, the communication module defines a communication strategy related to the organization and the identified stakeholders. During initiation stage 204, a communication plan is defined based on the communication strategy. A plurality of communication factors is identified. The plurality of communication factors includes audience, type of communication, methods of communication, source of communication and frequency of communication. The audience includes external and internal audience. Examples of type of communication include, but are not limited to, strategic direction, status updates, client feedback, reports, issues and escalations. Examples of source of communication include, but are not limited to, PMO, the customer, and a project manager. Further, an approval is obtained from the identified stakeholders on the communication plan. Thereafter, the plurality of governance bodies is established based on the one or more criteria. A plurality of protocols is defined for each of the plurality of governance bodies to align the governance bodies with the one or more goals and objectives of the customer. Further a mechanism of reporting structure is defined for the members in the plurality of governance bodies. During execution stage 206, performance of the plurality of governance bodies is reviewed regularly. The plurality of governance bodies are modified in accordance with the review. Further, progress of the program is reviewed at an identified frequency. The scope of the review includes, but is not limited to, the goals and objectives of the program, issues, the one or more risks and tracking of the quality of the program. During closure stage 208, learning and feedback on the process guidelines in Governance module 124 is recorder for reference in future. The process aids in Governance module 124 include a program management plan template, a measurement and analysis guidelines, a communication plan template and program roles and responsibilities guidelines. The output of Governance module 124 includes the governance plan, a program dashboard, and program metrics. Further, the output of communication module includes the communication plan, status reports, issue logs, meeting notes, action pans, results and performance reports.

Program setup module 126 converts the strategic objectives of the program into an operational level plan. The operational level plan includes a mechanism for execution and management of the program. Inputs for Program setup module 126 include the proposal, the program charter, the deployment plan, the program scorecard and a cost benefit analysis report. During pre-initiation stage 202, the policies, procedures, standards, data and back-ground information related to the process guidelines in Financial management module 112 are collated. Policy and procedure manual on budget planning, allocation, approval, reporting and control is obtained. Further, the operational standards associated with budget are studied. The procedure steps and applicable standards for budget planning, reporting and control are identified. Furthermore, policy and procedure on resource, acquisition, allocation, deployment, and de-allocation are obtained. The operational standards associated with resource management are studied to identify the procedure steps and applicable standards for resources acquisition and deployment. Similarly, the policies, procedures, standards, data and back-ground information related to the process guidelines in Governance module 124 are collated. The policy and procedure manual on Performance Management is obtained for the operational standards associated with Performance Management. This helps in identifying the procedure steps and applicable standards for Performance Management. Thereafter, policy and procedure on governance are obtained to study the operational standards associated with governance. This helps in identifying the procedure steps and applicable standards for governance. Similarly, the policies, procedures, standards, data and back-ground information related to the process guidelines in Knowledge management module 120 are collated. Policy and procedure manual on Knowledge Management are obtained to study the operational standards associated with Knowledge Management and training. This helps in identifying the procedure steps and applicable standards for Knowledge Management and training. Thereafter, the policies, procedures, standards, data and back-ground information related to the process guidelines in Knowledge management module 116 are collated. Policy and procedure manual on Change Management is obtained to study the operational standards associated with Change Management. This helps in identifying the procedure steps and applicable standards for Change Management. Furthermore, the program charter prepared as the output of Strategic planning module 110 is studied to obtain relevant information and data point from the program charter. During initiation stage 204, a plurality of high level work tracks are defined. For defining the plurality of high level work tracks, the strategy plan is studied. Thereafter, the scope of the solution is studied to prepare logical sub-group of scope based on geography, business process components, business entity and combinations thereof. This helps in identifying one or more activities common to the plurality of high level work tracks and defining one or more core tracks from amongst the plurality of high level work tracks. Further, in-scope and out-scope are defined for each of the one or more core tracks. The interdependency among the one or more core tracks may also be defined. Further, a track level score card is developed for the one or more core tracks. The track level score card is developed based on a program level scorecard, and the goals and objectives of the program. Furthermore, a drill-down structure for high level measurement with track level measurements is developed to ensure that track level measurements cover measures related to finance, scope, schedule, risk, people and the customer. Thereafter, one or more methods of measurement, data collection, analysis and reporting are established. Further, a program office is established. The program office includes one or more office members from the organization and one or more track leads. The roles and responsibilities of one or more office members and one or more track leads are defined. Subsequently, an execution methodology and schedule are developed for each of the one or more core tracks. Based on the execution methodology and schedule, deliverables and high-level timelines are defined.

Based on the above, a program management plan is developed related to the process guidelines in Strategic planning module 110, Financial management module 112, Risk management module 114, Organization change management module 116, Stake holder management module 118, Knowledge management module 120, Contractual compliance module 122, and Governance module 124. The program management plan includes a plan for Human Resources policies of the organization. The Human Resources policies of the organization include policies for appraisals, rewards and recognitions. The program management plan further includes a plan for procurement and solicitation of necessary program resources by referring to the policies related to resource acquisition and deployment. Further, an audit mechanism is identified to ensure compliance to the program management plan. The audit mechanism includes defining of procedures, standards, measurement and metrics for execution, monitoring and control. Subsequently, group reviews of the program management plan are conducted with the one or more members of the program office. After the group review, an approval on the program management plan is obtained from the customer.

Program setup module 126 includes a Performance management module. The Performance management module defines meaningful output of the program and provides techniques to measure the meaningful output of the program. Inputs for the Performance management module include the plurality of strategic objectives, a stakeholder matrix, a schedule of the program, the communication plan and the program charter. During pre-initiation stage 202, monitoring of the program charter is done. It is ensured that the process guidelines are being executed in accordance with the directions of the customer. During initiation stage 204, the goals and objectives, one or more milestones and one or more performance parameters are studied. The program charter and the program management plan. Further, the track level scorecard is aligned with the program level scorecard. It is ensured that lead members of each of the tracks understand the goals and objectives and their relationship with the tracks. Furthermore, the program management plan and the program charter are revised based on the review by the identified stakeholders. The revised program charter and the program management plan are communicated to the one or more identified stakeholders. Thereafter, relevant techniques are defined for monitoring of performance of the program. During execution stage 206, the implementation of the program management plan is ensured. It is ensured that each of the process guidelines in Strategic planning module 110, Financial management module 112, Risk management module 114, Organization change management module 116, Stake holder management module 118, Knowledge management module 120, Contractual compliance module 122, and Governance module 124. Further, one or more audit mechanisms are set up to identify any gaps in the implementation of the program management plan. Further, the progress of each of the plurality of high level work tracks is monitored based on a track level status report for each of the plurality of high level work tracks. The performance of each of the plurality of high level tracks is analyzed based on the track level scorecards. Furthermore, program level tasks are monitored based on a plurality of program level parameters. Data related to each of the plurality of high level work tracks is consolidated. Thereafter, performance of the program is reviewed and variances are evaluated. The variances are evaluated with respect to the baseline goals set for the performance metrics. One or more defined parameters are monitored with respect to the tolerance limit for the variances. Trigger alerts are defined based on the tolerance limits of the variance. Moreover, impact of the variances on the one or more critical success factors is evaluated. Also, impact on the interdependence of performance of parameters on each of the plurality of high level tracks is evaluated. Furthermore, risk assessment is performed based on trigger alerts. Subsequently, the program team is evaluated in accordance with the defined human resource policies of the organization. One or more actions are taken based on the evaluation. The one or more actions include rewards, recognition, and revisiting of training plan. Thereafter, analytics is performed for optimization of the program. Various analytics and statistical techniques, drill, slice and dice are used on the performance parameters with respect to cost, resource utilization and returns. Based on this, one or more prediction models are defined for forecasting and optimization of resources and budgets and investments. A performance report is provided to the identified stakeholders. In an embodiment, customized reports/dashboards can be made for the identified stakeholders. The report includes suggested action plans for de-risking and correction, program optimization, contributions of each of the program team members. Feedback is obtained on prioritization, budget, resources and interdependency. Based on the feedback, decisions, prioritization and action points are documented. Also, the owners are assigned for each of the action points. Thereafter, each of the program level plans and the track level plans are revised based on the performance parameters and the feedback. An approval of the identified stakeholders is obtained on the revised plans. During closure stage 208, a program closure analysis is performed. The program closure analysis includes analysis of actual program performance with respect to the program management plan. The analysis includes overall program and the plurality of high level tracks, in-process performance and final performance, and intermediate achievements of the goals and objectives. Further, evaluation of achievements of the goals and objectives and the one or more critical success factors is performed. Subsequently, knowledge sharing sessions are conducted to share learnings across the one or more stages of the lifecycle of the program. The knowledge sharing sessions include the best practices and the metrics of the program. Further, Causal analysis on variance on performance beyond tolerance limits is performed. Subsequently, the closure reports are submitted to the identified stakeholders. Moreover, the output and the knowledge management benefits of the program is communicated to the identified stakeholders. The output of the Performance management module includes a track level score card and a program level scorecard, a program dashboard, periodic reports and the feedback of the identified stakeholders.

Figure 4:
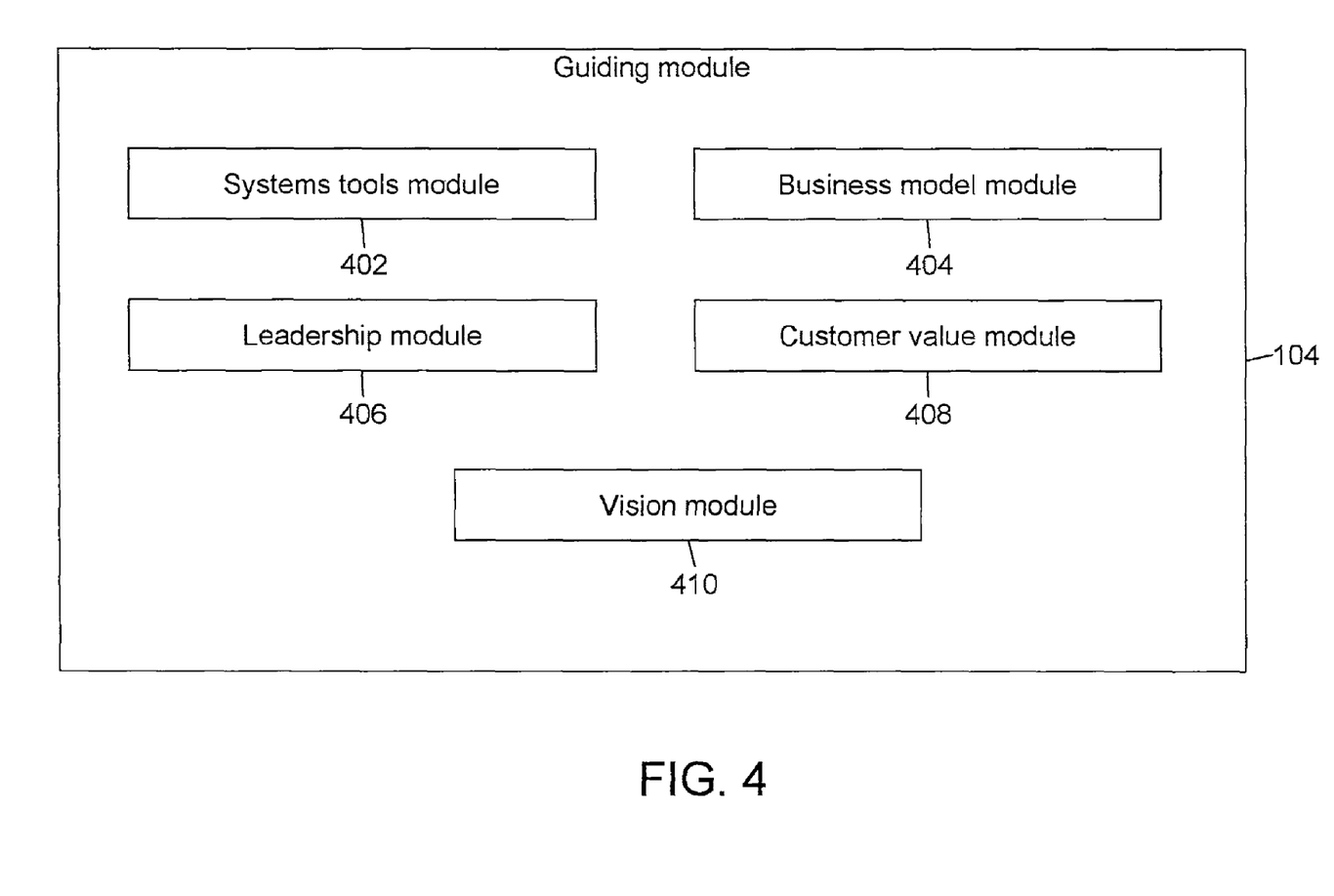
FIG. 4 is a block diagram of a Guiding module, in accordance with an embodiment of the invention.

FIG. 4 is a block diagram of a Guiding module 104, in accordance with an embodiment of the invention. Guiding module 104 includes a Systems tools module 402, a Business model module 404, a Leadership module 406, a Customer value model 408, and a Vision module 410.

Guiding module 104, integrates a plurality of organizational attributes with the process guidelines in Process module 102. In other words, guiding module 104 helps in streamlining the function of process module 102 by taking into account organization policies, rules and standards. The plurality of organizational attributes are included in each of Systems tools module 402, Business model module 404, Leadership module 406, Customer value model 408, and Vision module 410. Systems tools module 102 includes one or more tools provided for management of the lifecycle of the program. Business model module 404 integrates features of the business model of the organization with the one or more stages of the lifecycle of the program. Leadership module 406 defines leadership competencies of the organization. Further, Leadership module 406 integrates the leadership competencies with the one or more stages of the lifecycle of the program. Customer value module 408 defines one or more guidelines for customer value management. Customer value management includes providing quality solutions to the customer to enhance overall value for the identified stakeholders. The one or more guidelines are integrated with the one or more stages of the program lifecycle. Vision module 410 provides a corporate vision to the lifecycle. The corporate vision may include the vision of the organization and the customer. The plurality of process guidelines in Process module 102 are defined based on the corporate vision in Vision module 410.

Program mapping module 106 maps plurality of process guidelines with the one or more stages of the life cycle. Program mapping module 106 performs the mapping of each component of process module 102 with each stage of the life cycle. This has been explained in conjunction with FIG. 2 and FIG. 3. Matrix module 108 includes a matrix for assignment of program management roles to the one or more participants. Examples of the matrix include, but are not limited to, a Responsibility assignment (RASCI) matrix. An exemplary Responsibility assignment (RASCI) matrix is illustrated in conjunction with FIG. 5. One or more roles are assigned to each of the one or more participants. The one or more roles include responsibility, accountability, support, consultation and information. It will be apparent to a person ordinarily skilled in the art that RASCI matrix is a commonly used matrix for role assignments.

The present invention provides a framework for managing a lifecycle of a program in an organization. The framework organizes program management activities across program life cycle stages and core processes required for planning and execution of the program. The framework includes processes to facilitate efficient execution of related projects based on the plurality of strategic objectives. The integration of organizational attributes with the process guidelines provides a comprehensive management technique for the program for management of large business transformations. The framework is applied in management of business transformation initiatives of the customer and Internal business transformation programs. Further, complex projects and stand-alone program management consulting assignments can be managed with the help of the framework. Furthermore, the framework can be modified accordingly to be used by engagement managers and delivery managers of the organization.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A non-transitory computer-readable medium comprising computer-executable instructions stored therein for causing a computer to implement a framework for managing a lifecycle of a program in an organization, the lifecycle comprising one or more stages, the framework comprising:
  a. a process module configured to provide a plurality of process guidelines for the one or more stages of the lifecycle, the process module comprising:
    i) a strategic planning module configured to generate a strategy plan for achieving a plurality of strategic objectives associated with the program;
    ii) a financial management module configured to define procedures for monitoring financial information of the program to attain the plurality of strategic objectives;
    iii) a risk management module configured to analyze risks associated with the program;
    iv) an organization change management module configured to create a mechanism for managing change in the structure of the organization in accordance with the plurality of strategic objectives;
    v) a stakeholder management module configured to:
      identify stakeholders in the organization;
      assess impact of the identified stakeholders by mapping power and scale of the impact across the identified stakeholders;
      identify one or more conflicts between the identified stakeholders;
      identify risks associated with the one or more conflicts; and
      define strategies for managing the identified stakeholders based on the identified risks and the assessed impact;
    vi) a knowledge management module configured to define procedures for managing knowledge obtained during the one or more stages of the lifecycle of the program;
    vii) a contractual compliance module configured to provide a regulatory mechanism for compliance with a plurality of contractual obligations in the program;
    viii) a governance module configured to provide a plurality of directions for decision making during the lifecycle;
    ix) a program setup module configured to convert the plurality of strategic objectives of the program into an operational level plan;
  b. a guiding module configured to integrate a plurality of organizational attributes with the process guidelines of the process module;
  c. a program mapping module configured to map the plurality of process guidelines with the one or more stages of the life cycle; and
  d. a matrix module configured to provide assignment of program management roles to one or more participants in the program.

2. The computer-readable medium of claim 1, wherein the program comprises a plurality of related projects, the plurality of related projects being executed to attain the plurality of strategic objectives.

3. The computer-readable medium of claim 1, wherein the one or more stages of the lifecycle comprises a pre-initiation stage, initiation stage, execution stage and closure stage.

4. The computer-readable medium of claim 1, wherein the matrix module includes a Responsibility assignment (RASCI) matrix.

5. The computer-readable medium of claim 1, wherein the process module further comprises one or more process aids associated with each of the strategic planning module, the risk management module, the financial management module, the organization change management module, the stake holder management module, the knowledge management module, the contractual compliance module, the governance module and the program setup module.

6. The computer-readable medium of claim 5, wherein the process aids comprise a plurality of templates, a plurality of trackers, a plurality of questionnaires and a plurality of guidelines.

7. The computer-readable medium of claim 1, wherein the governance module comprises a communication module configured to regulate exchange of information during the life cycle.

8. The computer-readable medium of claim 1, wherein the program setup module comprises a performance management module configured to provide techniques to measure the output of the program.

9. The computer-readable medium of claim 1, wherein the guiding module comprises a systems tools module configured to provide and manage one or more tools for managing the lifecycle.

10. The computer-readable medium of claim 1, wherein the guiding module further comprises a leadership module configured to define leadership competencies for the organization and integrate the leadership competencies with the one or more stages of the lifecycle.

11. The computer-readable medium of claim 1, wherein the guiding module further comprises a customer value module configured to define one or more guidelines for customer value management, the customer value management comprising providing quality solutions to customers to enhance overall value for the identified stakeholders.

12. The computer-readable medium of claim 1, wherein the guiding module further comprises a vision module configured to provide and integrate corporate vision into the one or more stages of the program lifecycle.

13. The computer-readable medium of claim 1, wherein the plurality of organizational attributes comprise policies, rules and standards.

14. The computer-readable medium of claim 1, wherein the guiding module comprises a business model module configured to integrate a business model of the organization with the one or more stages of the life cycle.

15. The computer-readable medium of claim 1, wherein the stakeholder management module is further configured to define a stakeholder matrix, the stakeholder matrix comprising influence, attitude, political ramifications and expectations for each stakeholder and a strategy to manage each of the stakeholders.

16. A non-transitory computer-readable medium comprising computer-executable instructions stored therein for causing a computer to implement a framework for managing a lifecycle of a program in an organization, the lifecycle comprising a plurality of stages including a pre-initiation stage, an initiation stage, an execution stage and a closure stage, the framework comprising:
 (a) a process module configured to provide a plurality of process guidelines associated with the plurality of stages of the lifecycle for achieving a plurality of strategic objectives associated with the program, the process module comprising:
  i) a strategic planning module configured to generate stage-by-stage process guidelines associated with each of the plurality of stages,
   the process guidelines associated with the pre-initiation stage comprising collecting data and performing a background study related to the program, defining strategic goals and objectives of the program, performing a cost-benefit analysis related to the strategic goals and objectives, and preparing a program charter based on the scope of business process impacted,
   the process guidelines associated with the initiation stage comprising developing a solution to attain the goals and objectives and developing a multi-phase deployment plan for execution of the solution,
   the process guidelines associated with the execution stage comprising modifying the cost-benefit analysis based on the solution and the deployment plan and implementing the program charter;
  ii) a governance module configured to provide a plurality of directions for decision making during the lifecycle;
  iii) a program setup module configured to convert the plurality of strategic objectives of the program into an operational level plan; and
  iv) a stakeholder management module configured to:
   identify stakeholders in the organization;
   assess impact of the identified stakeholders by mapping power and scale of the impact across the identified stakeholders;
   identify one or more conflicts between the identified stakeholders based on the assessed impact;
   identify risks associated with the one or more conflicts; and
   define strategies for managing the identified stakeholders based on the identified risks associated with the one or more conflicts;
 (b) a guiding module configured to integrate a plurality of organizational attributes with the process guidelines of the process module;
 (c) a program mapping module configured to map the plurality of process guidelines with the respective associated stages of the life cycle; and
 (d) a matrix module configured to provide assignment of program management roles to one or more participants in the program.

17. The computer-readable medium of claim 16, wherein the process module further comprises:
 i) a financial management module configured to define procedures for monitoring financial information of the program to attain the plurality of strategic objectives;
 ii) a risk management module configured to analyze risks associated with the program;
 iii) an organization change management module configured to create a mechanism for managing change in the structure of the organization in accordance with the plurality of strategic objectives;

iv) a knowledge management module configured to define procedures for managing knowledge obtained during the lifecycle of the program; and v) a contractual compliance module configured to provide a regulatory mechanism for compliance with a plurality of contractual obligations in the program.

18. A non-transitory computer-readable medium comprising computer-executable instructions for performing a method of managing a lifecycle of a program in an organization, the lifecycle comprising a plurality of stages including a pre-initiation stage, an initiation stage, an execution stage and a closure stage, the method comprising:

(a) providing a plurality of process guidelines associated with the plurality of stages of the lifecycle for achieving a plurality of strategic objectives associated with the program, the providing a plurality of process guidelines comprising:

(i) generating stage-by-stage process guidelines associated with each of the plurality of stages, the process guidelines associated with the pre-initiation stage comprising collecting data and performing a background study related to the program, defining strategic goals and objectives of the program, performing a cost-benefit analysis related to the strategic goals and objectives, and preparing a program charter based on the scope of business process impacted, the process guidelines associated with the initiation stage comprising developing a solution to attain the goals and objectives and developing a multi-phase deployment plan for execution of the solution, the process guidelines associated with the execution stage comprising modifying the cost-benefit analysis based on the solution and the deployment plan and implementing the program charter;

(ii) managing stakeholders in the organization, the managing comprising:

identifying stakeholders in the organization;

assessing impact of the identified stakeholders by mapping power and scale of the impact across the identified stakeholders;

identifying conflicts between the identified stakeholders based on the assessed impact;

identifying risks associated with the conflicts; and defining strategies for managing the identified stakeholders based on the identified risks associated with the conflicts;

(iii) providing a plurality of directions for decision making during the lifecycle; and (iv) converting the plurality of strategic objectives of the program into an operational level plan;

(b) integrating a business model of the organization with the process guidelines for each of the plurality of stages of the life cycle;

(c) mapping the plurality of process guidelines with the respective stages of the life cycle; and (d) assigning program management roles to one or more participants in the program.

* * * * *